C. A. SOULE.
TROLLEY.
APPLICATION FILED FEB. 11, 1910.

1,095,990.

Patented May 5, 1914.

WITNESSES:
Chas H Young
S. Davis

INVENTOR
Clarence A. Soule
BY
Parsons Hall Bodee
ATTORNEYS

UNITED STATES PATENT OFFICE.

CLARENCE A. SOULE, OF CANANDAIGUA, NEW YORK.

TROLLEY.

1,095,990.  Specification of Letters Patent.  Patented May 5, 1914.

Application filed February 11, 1910. Serial No. 543,248.

*To all whom it may concern:*

Be it known that I, CLARENCE A. SOULE, of Canandaigua, in the county of Ontario and State of New York, have invented a certain new and useful Trolley, of which the following is a specification.

My invention has for its object the production of a particularly simple and efficient trolley, and it consists in the combinations and constructions hereinafter set forth and claimed.

In describing this invention, reference is had to the accompanying drawings, in which like characters designate corresponding parts in all the views.

Figure 1:
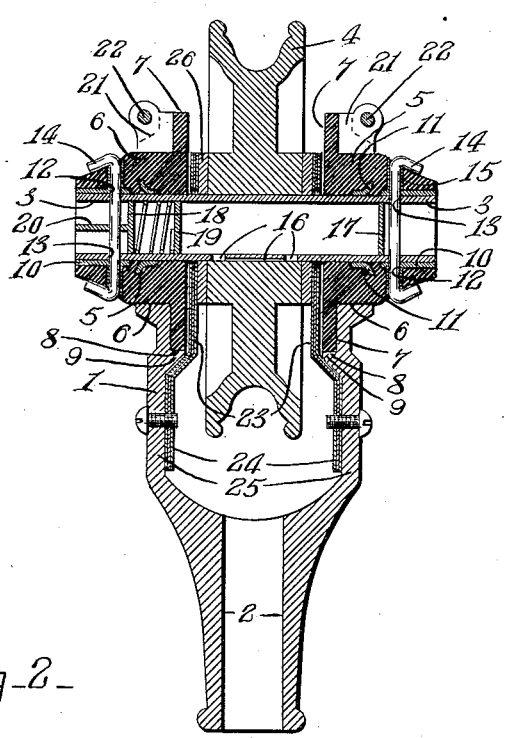
Figure 2:
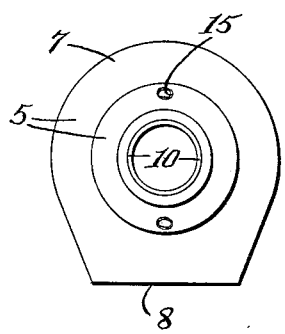
Figure 3:
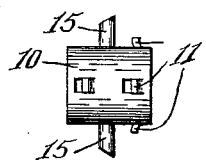

Figure 1 is a vertical sectional view of my trolley. Fig. 2 is a detail view of one of the insulating collars thereof. Fig. 3 is a detail view of one of the metallic sleeves embedded in the insulating collars.

1 is a harp having suitable means, as a socket 2, for attachment to the trolley pole. 3 is a shaft or spindle supported by the arms of the trolley harp, and 4 is a trolley wheel mounted on said spindle between the arms. In this trolley, the spindle 3 is completely insulated from the harp so that the current does not pass through the spindle and decompose the lubrication of the trolley wheel. As here shown, insulating collars 5 are supported by the arms of the trolley harp, and the spindle is supported in said collars. These collars extend through openings or bearings 6 in the arms and are provided with flanges 7 lapping the inner opposing sides of the arms, said flanges having flat edge faces 8 which engage shoulders 9 provided on the arms of the harp 1 for preventing the collars from turning. Preferably, metallic sleeves 10 are embedded in the collars, these sleeves being arranged coaxially with the collars and having ears 11 struck therefrom, which project into the body of the insulation of the collars and serve to firmly hold the sleeves in the collars. The sleeves 10 terminate short of the inner ends of the collars, and the inner faces of the sleeves, and the inner faces of the collars beyond the inner ends of the sleeves are flush, as clearly seen in Fig. 1. The collars are provided with transverse openings 12 and the sleeves are also provided with transverse openings alined with the openings 12 of the collars, and the spindle is provided with transverse openings 13 at their ends which are designed to be brought opposite the alined openings of the collars and sleeves, and keys 14 are passed transversely through said alined openings for holding the spindle in position and preventing the same from turning. Preferably, the transverse openings of the collars are provided with metal linings 15 embedded in the insulating collars and fixed in any suitable manner to the sleeves 10. Usually, the spindle 3 is hollow for receiving a lubricant and is formed with ducts 16 for conveying the lubricant to the outside of the spindle or bearing for the trolley wheel. One end of the spindle is permanently closed by a wall 17 and the other end is provided with a removable plug 18 carrying a spring-pressed plunger 19, which, when the spindle-cavity is filled with lubricant, tends to press the lubricant out through the ducts 16. This plug is formed with a wing 20 having an opening designed to be alined with the transverse openings 12 of one of the collars 5 so that one of the keys is passed transversely through the wing and holds the plug in position. Preferably, the arms are divided at 21 at their upper ends forming split bearings for the collars 5, and the portions of the bearings on opposite sides of the split 21 are clamped upon the collars 5, by suitable means, as screws 22.

The current is conveyed from the trolley wheel 4 around the insulating collars 5 to the harp by means of spring brushes 23 of well known construction, these brushes 23 comprising collars encircling the spindle and spaced apart therefrom and interposed between the hub of the trolley wheel 4 and the flanges 7 of the insulating collars 5. The lower ends of these brushes are provided with offset portions 24, and the lower ends of the arms of the harp are offset or widened at 25 so that the space between the arms at their lower ends is greater than the distance between said arms at their upper ends, and the offset portions 24 of the spring brushes are secured to the offset portions 25 of the arms of the harp. The advantage of this arrangement is that when the wheel becomes worn at its bearing after constant use and turns unevenly about its axis or has a tilt in one direction, the lower edge of the wheel will not contact with the arms of the harp, and thus jumping of the current from the rim of the wheel to the arms of the harp is avoided. Usually, washers 26 are interposed between the hub of the wheel 4 and the brushes.

What I claim, is:—

1. In a trolley, a harp formed with openings in the arms thereof, insulating collars carried by the arms of the harp and extending through said openings, metallic sleeves embedded in the collars and arranged coaxially therewith, the sleeves terminating short of the inner ends of the collars, a spindle supported by the collars and extending within said sleeves, a wheel mounted on the spindle between the collars, and means for carrying the current around the collars from the wheel to the harp, substantially as and for the purpose specified.

2. In a trolley, a harp formed with openings in the arms thereof, insulating collars carried by the arms of the harp and extending through said openings, metallic sleeves having prongs projecting therefrom, the sleeves being embedded in the collars and arranged coaxially therewith and terminating short of the inner ends of the collars, a spindle extending through the collars and through the sleeves, a wheel mounted on the spindle between the collars, and means for carrying the current around the collars from the wheel to the harp, substantially as and for the purpose set forth.

3. In a trolley, a harp formed with openings in the arms thereof, insulating collars carried by the arms of the harp extending through said openings and having flanges lapping the opposing faces of the arms, metallic sleeves embedded in the collars and arranged coaxially therewith, a spindle extending through the collars and through the sleeves, a wheel mounted on the spindle between said flanges, and means extending between the flanges and the wheel for conducting the current around the flanges from the wheel to the harp, substantially as and for the purpose described.

4. In a trolley, a harp formed with openings in the arms thereof, collars of insulation carried by the harp and extending through said openings and provided with transverse openings, metallic linings for the transverse openings, the linings being embedded in the collars, a spindle extending into the collars and having transverse openings arranged to be brought into alinement with the transverse openings of the collars, keys extending through the alined transverse openings of the collars and the spindle, a wheel mounted on the spindle between the collars, and means for carrying the current around the collars from the wheel to the harp, substantially as and for the purpose specified.

5. In a trolley, a harp formed with openings in the arms thereof, insulating collars carried by the arms and extending through said openings and having flanges lapping opposing faces of said arms, and also having transverse openings, metal sleeves embedded in the collars and having ears projecting therefrom and embedded in the collars, said sleeves also having transverse openings alined with those of the insulating collars, metallic linings for the transverse openings of the collars, the linings being fixed to the sleeves, a spindle extending through the collars and the sleeves and having transverse openings designed to be brought into alinement with the transverse openings of the collars and the sleeves, keys extending through the alined transverse openings, a wheel mounted on the spindle between the collars, and means for carrying a current around the collars from the wheel to the harp, substantially as and for the purpose set forth.

6. In a trolley, a harp having opposing split bearings, collars of insulation extending through said bearings, a spindle extending into the collars, keys for locking the collars and the spindle from movement, means for clamping opposite portions of the split bearings together upon the collars, a wheel mounted directly on the spindle, and means for carrying the current around the collars from the wheel to the harp, substantially as and for the purpose specified.

In testimony whereof, I have hereunto signed my name in the presence of two attesting witnesses, at Canandaigua, in the county of Ontario, in the State of New York, this 24 day of December, 1909.

CLARENCE A. SOULE.

Witnesses:
  HOMER J. REED,
  JENNIE CULLINANE.

---

Copies of this patent may be obtained for five cents each, by addressing the "Commissioner of Patents, Washington, D. C."